United States Patent [19]
Bäurle et al.

[11] Patent Number: 5,101,092
[45] Date of Patent: Mar. 31, 1992

[54] METHOD FOR REDUCING THE GENERATION OF NOISE DURING ARC WELDING

[75] Inventors: Klaus Bäurle, Wangen; Florian Maciaszczyk, Ebersbach; Wolfgang Schuster, Esslingen, all of Fed. Rep. of Germany

[73] Assignee: Rehm Schweisstechnik GmbH u. Co., Fed. Rep. of Germany

[21] Appl. No.: 660,624

[22] Filed: Feb. 25, 1991

[30] Foreign Application Priority Data

Feb. 28, 1990 [DE] Fed. Rep. of Germany ....... 4006203

[51] Int. Cl.⁵ .............................................. B23K 9/09
[52] U.S. Cl. ........................ 219/137 PS; 219/130.51
[58] Field of Search ................. 219/137 PS, 130.51, 219/130.4, 130.31, 130.32, 130.33, 130.21, 130.1

[56] References Cited

U.S. PATENT DOCUMENTS 4,038,515 7/1977 Risberg .
4,371,776 2/1983 Winn .
4,876,433 10/1989 Kashima et al. .

FOREIGN PATENT DOCUMENTS 3816238 12/1988 Fed. Rep. of Germany .
62-176679 8/1987 Japan .............................. 219/137 PS Primary Examiner—Clifford C. Shaw
Attorney, Agent, or Firm—Speckman & Pauley

[57] ABSTRACT

A method for reducing the generation of noise during arc welding by alternating current with welding machines with clocked current sources is disclosed. By modifying the curent set value on the control side with temporally non-linear functions by a digital-analog converter, a flow of the welding current which has limited upper tones can be generated.

5 Claims, 3 Drawing Sheets

METHOD FOR REDUCING THE GENERATION OF NOISE DURING ARC WELDING

BACKGROUND OF THE INVENTION

1. Field of the Invention

This invention relates to a method for reducing the generation of noise during arc welding by means of alternating current with welding machines with clocked current sources U.S. Pat. Nos. 4,876,433; 4,371,776; 4,038,515 and German DE 38 16 238 A1 disclose different embodiments of clocked, regulated welding energy sources which are suitable for welding with alternating current or for pulse welding and which provide reversible polarity.

In these known welding energy sources, the current set value is not changed, beginning with the polarization change request, as a function of time, resulting in the generation of considerable noise during welding Only a few years ago, it was the goal of the manufacturers of welding machines, for example, ac-TIG welding machines, to generate a shape of the current flow as rectangular as possible at the time of the polarization change of the output current or the welding current flow.

However, the disadvantage of such a rectangular-shaped welding current is considerable noise pollution. A welding arc of an ionized gas flow is subjected to the magnetic fields of the welding current and the gas molecules follow the changes of the magnetic field almost inertialess. This, in essence, constitutes a loudspeaker with a gas diaphragm. It is known to split a rectangular flow in accordance with Fourier into base and upper oscillations. Consequently, the rectangular-shaped flow of the welding arc emits a sonic frequency mixture rich in upper tones and thus is very loud.

In present-day inverter machines, it is possible to set the steepness of the current flow at the time of polarization change by means of the size of the output choke. Thus, maximum steepness is calculated from di/dl -U/L, where U is the maximally possible initial voltage and L is the inductance of the output choke. It is indeed possible to make the output current flow more trapezoidal using a choke with large inductance Such a flow generates fewer upper tones and thus the welding noise is reduced. However, the great disadvantage of this method is that it automatically negatively affects the dynamics of the current source. It also limits the maximally possible polarization change frequency at the output and greatly changes the shape of the curves of the welding current with different alternating frequencies.

Other known methods utilize additional filters to reduce the higher frequency portions in the output circuit in order to minimize noise. However, it should be noted that this requires condensers and chokes which must be designed for the full welding current and, therefore, are necessarily expensive. The disadvantages of these methods arise from the fact that it is only possible to use a few passive components and thus only a few, special curve shapes of the welding current can be generated. By adding filters, the dynamics of the current regulation are negatively affected. In addition, a passive filter has the corner values fixed by the components, while the alternating frequency of the welding current can change considerably.

Clearly, the noise level generated by ac-welding machines constitutes an essential environmental factor for people who must work every day with or next to them.

SUMMARY OF THE INVENTION

It is an object of this invention to reduce the noise emitted during ac welding by means which do not negatively affect the dynamics of the machine This object is attained in accordance with this invention where the set value of the current is multiplied by a value which changes with time and which, starting with the polarization change request, first decreases the set value for the output polarity in accordance with a non-linear function and, following polarization change, allows it to increase again in a symmetrical manner to the original value. This value which changes with time is generated using a digital-analog converter and a digital drive logic.

The drive logic is designed such that a bit pattern generator can be driven by a clock signal and generate fixed bit patterns to a digital-analog converter.

In accordance with a further embodiment of this invention, the clock signal can be slowed or suppressed if the actual current is unable to follow the set current.

It is also advantageous that the clock signal can be changed as a function of the polarization change frequency.

This invention will be explained in detail by means of the drawings.

DESCRIPTION OF PREFERRED EMBODIMENTS

Figure 1:
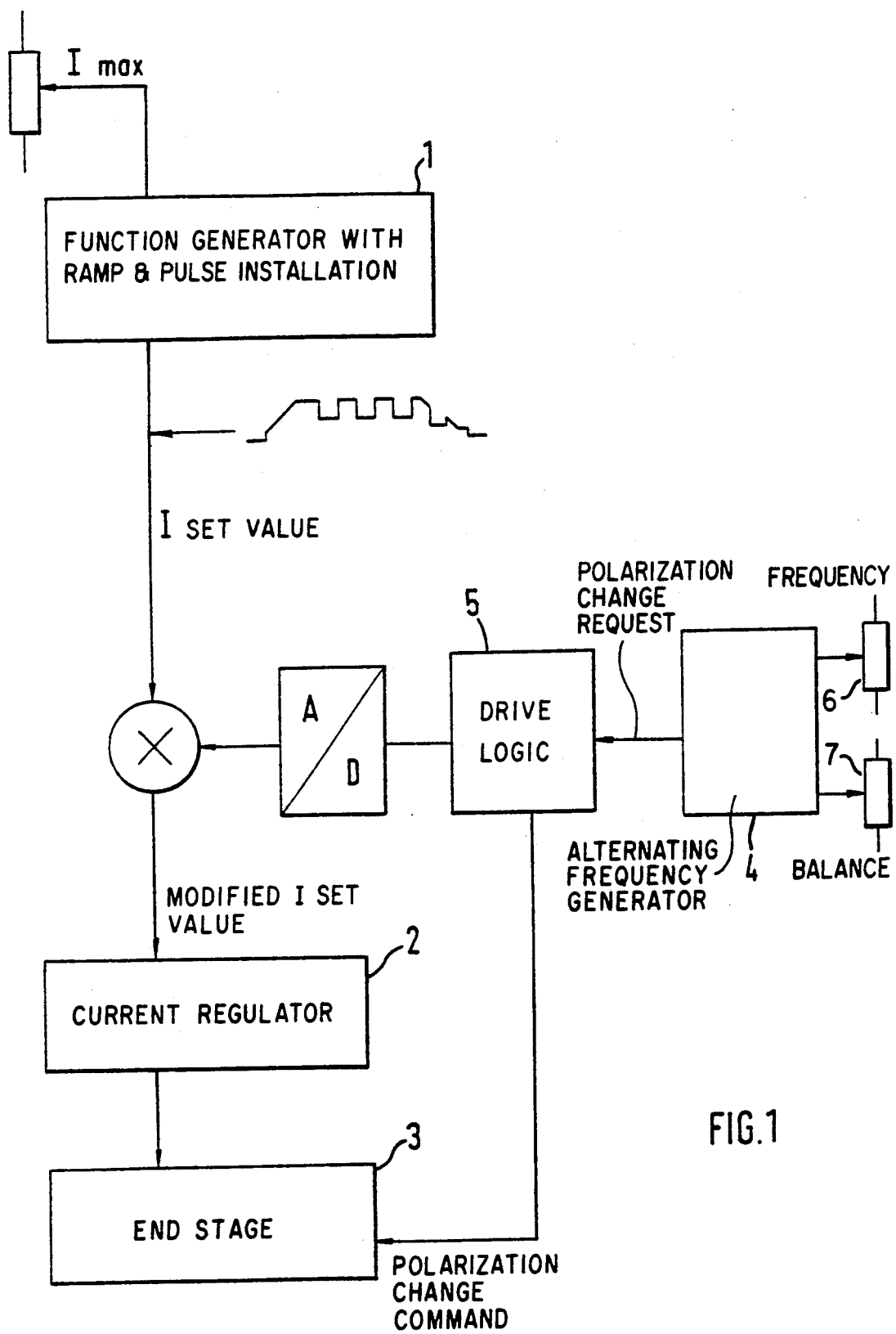
FIG. 1 shows the method in accordance with one embodiment of this invention in cooperation with other functional units of a welding machine.

FIG. 1 shows one embodiment of the method of this invention in conjunction with an exemplary TIG-welding machine The desired maximum output current is set by the operator, for example, with a potentiometer 6, 7. A subsequent function generator 1 thus generates the functional sequences typical for TIG welding, with ramps at the beginning and end and, if required, with a pulse function. A diagram in the oval field shows one possible shape of the generated current set value. Normally, this set value is supplied directly to the current regulator 2, which then drives the power end stage 3 Usually an alternating frequency generator 4 is present and is connected to two potentiometers. The frequency can be set on the first potentiometer 6 and the balance or symmetry on the second potentiometer 7. The alternating frequency generator 4 supplies the polarization change request for the end stage 3 where the polarity of the output current is reversed. In accordance with one embodiment of this invention, there are additional functional groups which are connected to each other as shown in FIG. 1.

The output of the alternating frequency generator 4—identified in FIG. 1 as polarization change request does not directly lead to the end stage 3, but rather is supplied to a drive logic 5. The drive logic 5 then generates a bit pattern sequence which is supplied to a digital-analog converter. The analog output value of the d/a converter is now multiplied in a known manner with the set value derived from the function generator 1. This results in the multiplied set value which is supplied directly or indirectly to the current regulator 2.

The generated bit pattern sequence is such that, over the course of time, first the set value is decreased in accordance with a non-linear function and, after polarization change, again grows to its initial value in a symmetrical manner. The non-linear function may have, for example, the flow of the cosine, or may also be arbitrarily optimized in accordance with other criteria, preferably those relating to reduction of noise Another signal—identified in FIG. 1 as polarization change command—is generated in the drive logic 5. When the bit pattern generates a value corresponding to zero, that is, when the modified set value has become zero, the command for changing the output polarity is transmitted to the end stage 3

Figure 2:
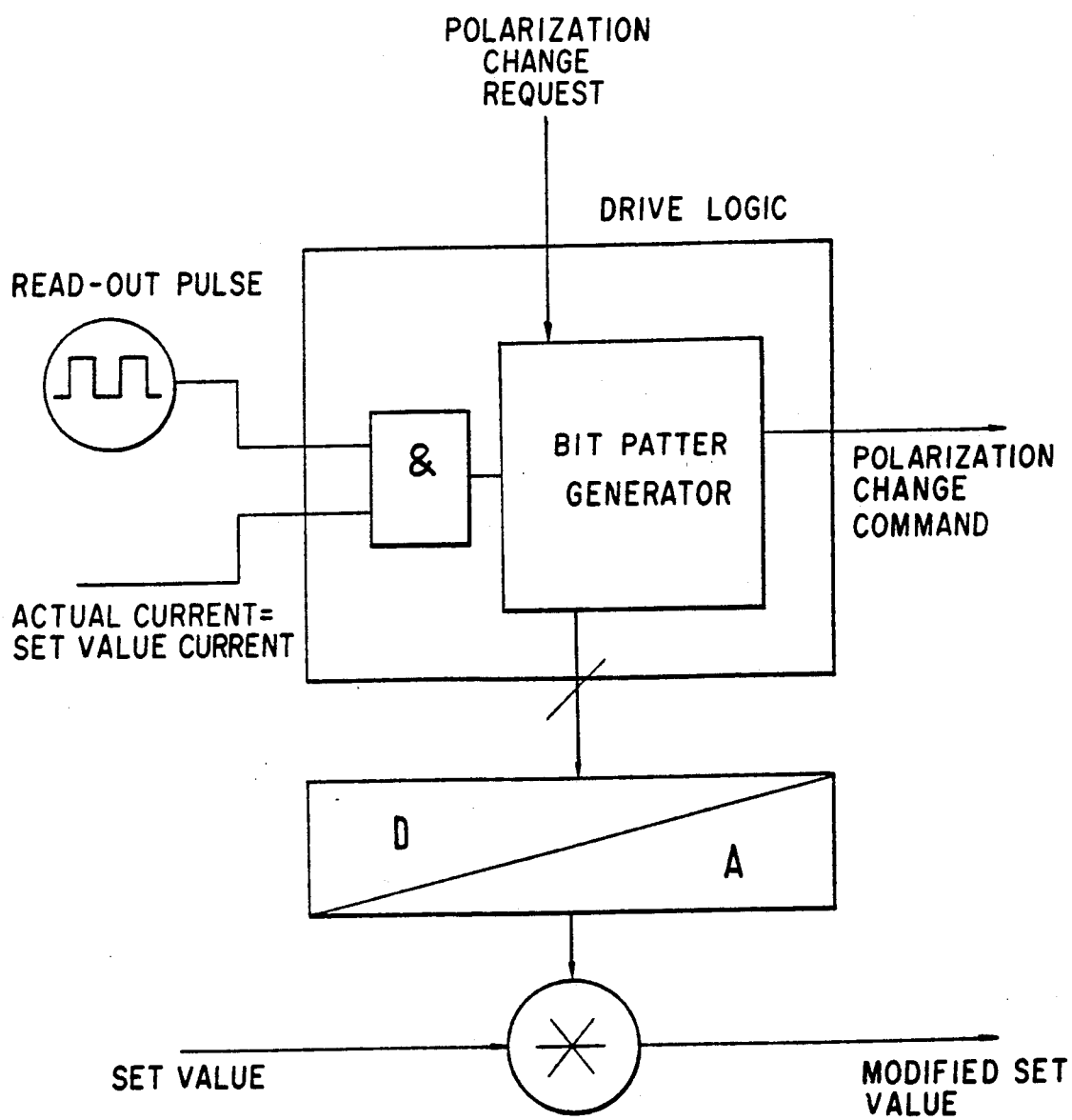
FIG. 2 shows a design of the drive logic.

FIG. 2 shows a design of the drive logic in accordance with one embodiment of this invention. One possible input to the bit pattern generator is a read-out pulse which triggers an address counter connected to a memory module. The desired bit pattern sequence is then generated at its output with correct programming of the memory module. It is obvious that it is also possible to generate the desired bit pattern sequence with known means of processor technology.

In FIG. 2 a signal with the legend "actual current =set current" is shown which leads to an AND-gate. Accordingly, when the output of the set values changes so rapidly that the actual current no longer can follow the set current, the read-out pulse is suppressed. In this case, it is possible that a greater difference between the actual and the set values is generated which the current regulator would attempt to remove in accordance with the maximum speed possible for it. In such instances, the rounded-off, noise-reducing current flows fall by the wayside. For this reason, the actual, new set value is established only when a signal has been received from the current regulator, or another, appropriate point, indicating that the actual current is equal to the set current.

In accordance with another embodiment of this invention, the clock rate of the bit pattern generator is a function of the polarization change frequency. Thus, with low frequencies, the read-out of the bit pattern sequence would be slower than with high frequencies. As a result, independent of the polarization change frequency, the basic flow of the welding current is always the same, so that fixed relationships between peak currents, middle currents and effective currents are created.

Figure 3:
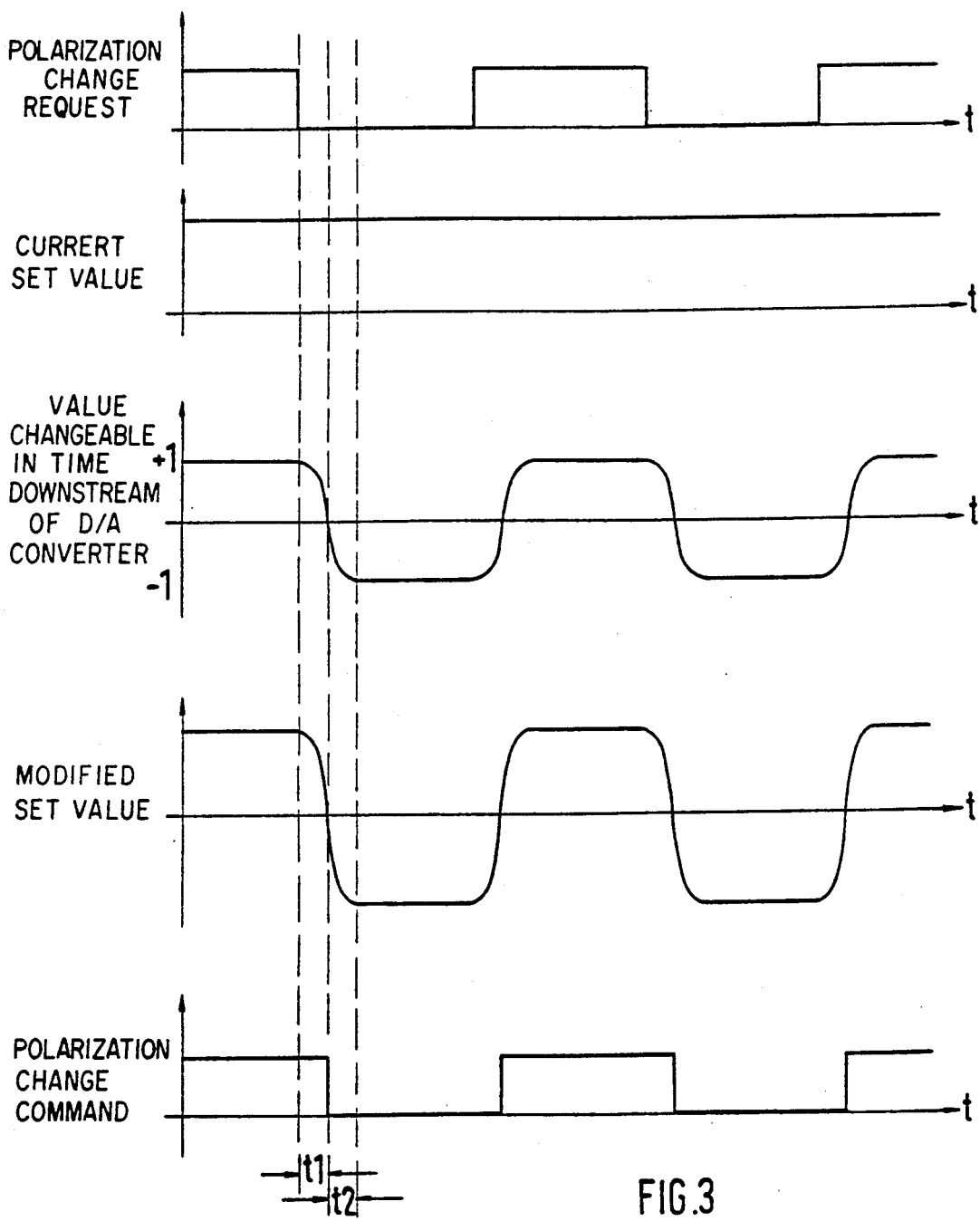
FIG. 3 shows possible time flows of relevant signals.

FIG. 3 shows possible signal flows of the relevant signals in accordance with this invention. These are the polarization change request and the current set value, which, for the cases shown, has been considered to be constant for the time interval considered. The bit pattern generator starts outputting its sequence when the flank of the polarization change request changes, and a value, which changes with time, can appear downstream of the d/a converter, as shown. The modified set value is generated following multiplication of this value with the set value. The amount of the current set value is decreased during the time t1 until it reaches zero. At this point in time the polarization change command is issued. The current set value increases during the time t2 in a symmetrical manner back to the original value, but with reversed polarity.

We claim:

1. In a method for reducing noise during arc welding by alternating current with welding machines with clocked current sources, the improvement comprising: multiplying a set value of a current by a value which changes with time and which, starting with a polarization change request, first decreases the set value for an output polarity in accordance with a non-linear function and, following the polarization change, increases the set point in a symmetrical manner to an original value, where the value which changes with time is generated by a digital-analog converter and a digital drive logic.

2. A method in accordance with claim 1, wherein a bit pattern generator of the digital drive logic, driven by a clock signal, generates and transmits bit pattern sequences to the digital-analog converter.

3. A method in accordance with claim 2, wherein a signal, preferably from a current generator, controls the clock signal for determining the bit pattern sequences, the signal slowing the clock signal if an actual current no longer can follow a set current.

4. A method in accordance with claim 3, wherein the clock signal can be changed as a function of a polarization change frequency.

5. A method in accordance with claim 2, wherein the clock signal can be changed as a function of a polarization change frequency.

* * * * *